July 23, 1929.  A. R. THOMPSON  1,721,751
PROCESS OF TREATING MILK
Filed March 21, 1927
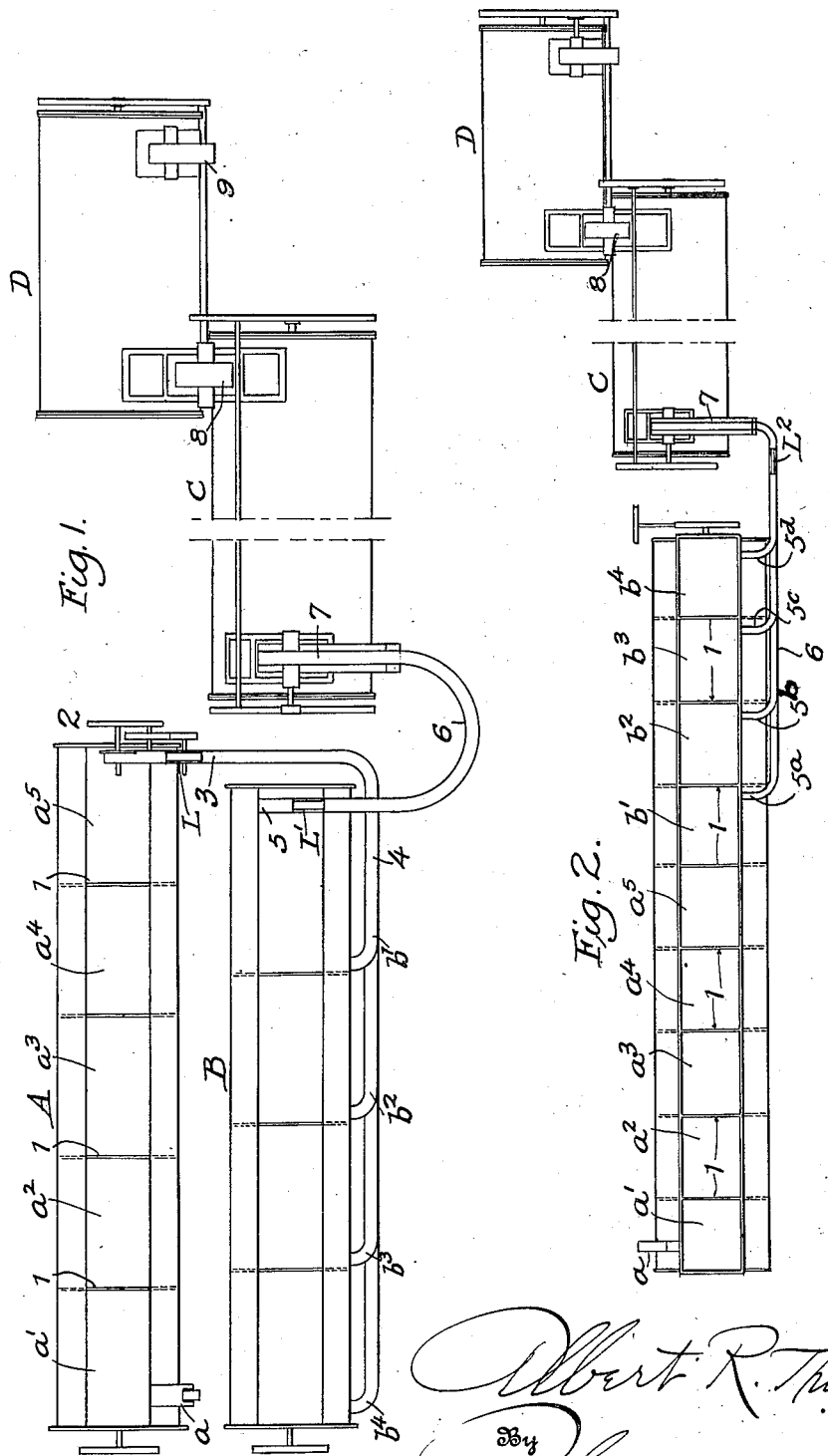

Patented July 23, 1929.

1,721,751

UNITED STATES PATENT OFFICE.

ALBERT R. THOMPSON, OF SAN JOSE, CALIFORNIA, ASSIGNOR TO ANDERSON-BARN-GROVER MFG. CO., OF SAN JOSE, CALIFORNIA, A CORPORATION OF CALIFORNIA.

PROCESS OF TREATING MILK.

Application filed March 21, 1927. Serial No. 176,983.

This invention is an improvement in the art or method of processing canned foods and is especially adapted for processing condensed or evaporated milk in hermetically sealed containers, and is an improvement upon the method or process disclosed in my Patent No. 1,491,038 dated June 24, 1924.

In my said patent I describe a method of processing milk in hermetically sealed cans consisting in passing the cans successively through a pre-heater in which their temperature is raised to a point below that required for sterilization; then passing said cans from said preheater into and through a sterilizer in which said containers are subjected to a temperature sufficient to sterilize the contents of the cans and to an exterior pressure above atmospheric; then passing said cans from said sterilizer into and through a cooler wherein the cans are subjected to a cooling medium under an external pressure sufficient to prevent internal pressure injuring the cans by rupturing, straining or distorting them; and finally discharging the cans from the cooler.

I have discovered that the quality of canned milk and its keeping properties are greatly improved by the following method of treatment. The milk should be gradually heated in the containers up to about 200° F. to 210° F. and then held at a temperature of about 210° F. for an appreciable time, according to the milk being treated.

Milk varies greatly from season to season, and also from day to day, and also in different localities, and the length of time at which the milk should be held at the uniform temperature of about 210° F., must be varied to suit the varying conditions of the milk itself. The deposition of a coating of albumin on the interior surfaces of the containers is prevented by subjecting the containers filled with the milk to a gradually increasing temperature beginning at about say 110° F. and increasing gradually to 200° F.; and subsequent separation of the milk in the containers is prevented by holding the containers for a few minutes at a uniform temperature of about 210°, as above stated, the time varying according to the nature of the milk being treated. Thereafter the milk can be sterilized by subjecting the containers to a temperature of 240° F., for the required time.

Heretofore a great deal of difficulty has been experienced in producing the desired viscosity in canned milk with a constant time factor; and while more or less viscosity may be obtained by varying the temperatures of the heat zones in the preheater, and varying the temperature to a certain extent in the sterilizer, the results are uncertain. I have discovered that by holding the cans under a constant temperature, or practically so, in the preheat holder prior to sterilizing, I obtain very gratifying and practically uniform results.

Hereafter I will for brevity refer to the containers filled with canned milk merely as "cans", but thereby I mean to include any suitable containers filled with the evaporated or condensed milk to be sterilized.

My invention consists in brief in a novel method of processing canned foods, and particularly canned milk comprising passing the cans in a continuous stream through a series of preheating regions of successively increasing temperature, beginning say at or below 110° and gradually increasing up to 200°; then passing the cans in a continuous stream through a series of preheating regions of successively increasing temperature, beginning say at or below 110° and gradually increasing up to 200°; then passing the cans into a preheat holding chamber where they are kept at a temperature of about 210° for a length of time, depending upon the nature of the milk; as above stated. The length of time that the cans are held in this holding chamber can be varied, as desired; preferably by varying the length of travel of the cans through said chamber without stopping or varying the speed of travel of the cans; either by varying the point of feed of the cans into the "holding" chamber, or varying the point of discharge of the cans therefrom. This holding chamber should be maintained at a uniform maximum temperature of approximately 210° F., below the temperature required for sterilizing. The cans are then passed from the holding chamber through a suitable sterilizer wherein the temperature is maintained at that required for sterilizing; usually at 240° F. The cans are finally passed from the sterilizer, without exposure to the atmosphere, into and through a cooler in which a temperature of about or below 150° is maintained; and the cans are retained in such cooler until their contents are sufficiently cooled to eliminate any danger of rupture of the cans by internal pressure when they are discharged into the atmosphere. The cans in passing from the preheater to the "holding" chamber, and from the latter to the sterilizer, are preferably passed through suitable "leaky" can detectors, so that any defective cans may be detected and removed.

In the accompanying drawings, I have conventionally illustrated two forms of apparatus by which my improved method may be successfully carried out; but it should be understood that the apparatus shown are merely illustrative, and other types or forms of apparatus may be used.

In said drawings:

Figure 1 is a diagrammatic plan view, partly broken, of one apparatus which may be used in carrying out my process.

Fig. 2 is a diagrammatic plan view of another apparatus which may be used in performing my process.

In carrying out my process using, apparatus such as shown in Fig. 1, I employ a primary heater A; a preheat holder B; a cooker or sterilizer C; and a cooler D; through all of which the cans are successively passed.

The preheater A, holder B, sterilizer C and cooler D are each preferably provided with a spiral canway and a reel for moving the cans therethrough, such as shown for example in my Patent No. 1,172,501 of February 22, 1916; also preferably the several tanks are approximately circular and the canways are attached directly to the walls of the tanks, as in my Patent Re. No. 11,996 of February 10, 1925.

The preheater A is divided into a plurality of compartments by suitable partitions, which may be such as shown in my Patent No. 1,385,594 of July 26, 1921, or Reissue No. 15,334 of April 11, 1922; or the compartments may be formed by interior partitions within and moving with the reel, as in my Patent No. 1,499,038. The particular construction of the preheater is not a feature of the present invention.

In the construction indicated in Figure 1 the preheater A is divided by spaced interior partitions 1, which divide it into five compartments, $a^1$, $a^2$, $a^3$, $a^4$, $a^5$ through which the cans are successively passed. Preferably the temperature in the first compartment is approximately 110° F.; in the second compartment 140° F., in the third compartment 160° F., and the fourth 180° F., and in the fifth compartment 200° F.; so that the cans passing successively through said compartments are gradually raised in temperature.

The preheat holder B, as shown in Figure 1, may or may not be divided into compartments; but a uniform temperature of about 210° F. is maintained therein, or in the compartments thereof through which the cans are passed.

A uniform temperature of about 240° F. is maintained in the cooker or sterilizer C; and a temperature of about 150° F. or less is maintained in cooler D.

The cans can be fed into chamber $a^1$ of the preheater through the inlet $a$, and are passed successively through the several chambers of the preheater to the outlet 2, where they are discharged into a runway 3, through which they pass by gravity to a canway 4, through which they may be moved by any suitable means. The canway 4 extends lengthwise of preheat-holder B and cans may be switched from the canway 4 into the preheat-holder B at any one of the several inlet points $b^1$, $b^2$, $b^3$, $b^4$, according to the length of time it is desired to hold the cans under uniform heat of about 210° F. before discharging them into the sterilizer C.

The cans are discharged from preheat-holder B, at the outlet 5, into a gravity chute 6, by which they are directed into the inlet valve 7 of the sterilizer C. This valve 7 may be constructed as shown in my Patent No. 1,188,581 of June 27, 1916; but preferably I use rotary valves such as shown in my Patent No. 1,385,594 and re-issue Patent No. 15,334; or any other suitable steam-tight feed valve may be used.

The cans are discharged from the outlet of the sterilizer C into the cooler D; preferably by means of a valve 8, adapted to receive cans from the outlet of the sterilizer and deliver them into the inlet of the cooler.

In the cooler D the temperature of the cans is reduced below 200° F., and the cans are finally discharged from the cooler ready for labeling and packing. This valve may be constructed as shown in my Patents No. 1,188,581 or 1,385,594 aforesaid. The cans may be discharged from the outlet of the cooler through a valve 9 which may be like valve 7.

As the temperature in the sterilizer is above 212°, a pressure above atmospheric should be maintained in the sterilizer, and also in the cooler, to prevent the cans bursting from internal pressure therein; and the cans should not be exposed to the atmosphere in passing from the sterilizer into the cooler.

Preferably a leaky can detector L is arranged between the outlet of the preheater A and the inlet of preheat-holder B; and a like leaky can detector L' is arranged between the outlet of the preheat-holder B and the inlet of the sterilizer C, so that leaky cans may be detected and removed before they reach the preheat-holder B or before they reach the sterilizer C. The leak detectors used are preferably like those shown in my Patent No. 1,485,895 of March 4, 1921.

In the apparatus shown in Fig. 2, instead of having the preheater and the preheat-holder in separate tanks, they are formed together in one long tank; one portion of said long tank being shown as divided by internal partitions 1 into five chambers $a^1$, $a^2$, $a^3$, $a^4$, $a^5$ (corresponding to the like chambers in the preheater A in Fig. 1) and respectively heated to 110° F.; 140° F.; 160° F.; 180° F.; and 200° F.: and the remaining portion of the tank may be either one chamber, but is shown as divided into four chambers $b^1$, $b^2$, $b^3$, $b^4$, all heated to a temperature of about 210° F. The preheated cans are passed successively through all the chambers $a^1$ to $a^5$, and one or more of the chambers $b^1$ to $b^4$, as desired; and the cans may be discharged from any one of the chambers $b^1$ to $b^4$ as desired, through their respective outlets $5^a$, $5^b$, $5^c$ or $5^d$, into a chute 6 by which they are directed to the inlet valve 7 of the sterilizer C; from which they are discharged through valve 8, into the cooler D, as above described. In this construction suitable means are provided by which the cans may be discharged from the preheat holder at any desired oulet ($5^a$, $5^b$, $5^c$, or $5^d$) according to the desired length of time of holding the cans at uniform temperature at 210° prior to their discharge into the sterilizer.

A leaky can detector $L^2$ is placed between the preheat-holder and the sterilizer, so that regardless of where the cans are discharged from the preheat-holder they will have to pass through the detector.

The cans are fed into the machine at $a$ and pass through the several heating regions, which are maintained at different temperatures until they reach the first outlet $5^a$; the temperature of the preheat holder being approximately 210° F. The cans may be taken out at this point, or may be allowed to pass on to the next outlet $5^b$; or they may go to the third, or whichever discharge the operator may select. The temperature in this preheat-holding portion of the apparatus from the first outlet $5^a$ to the last outlet $5^c$ is held substantially constant at approximately 210° F. In carrying out the process, the operator, after determining the character of the milk which is being handled, will select the outlet best adapted for the particular milk being treated.

The shells or tanks of the preheater, preheat-holder, sterilizer, and cooler, may each be constructed, if desired, like the tanks shown in my re-issue Patent No. 15,996; and steam heat may be supplied to the pre-heater, preheat-holder and sterilizer in the same manner. In the apparatus shown in Fig. 2, steam may be applied at both ends of the long tank and controlled from both ends, so that the several preheating zones can be maintained at successively higher temperatures as stated, and the preheat-holding portion can be maintained at a constant temperature of 210° F. The partitions for maintaining the heat zones man be mounted within and rotate with the reel as in the apparatus disclosed in my aforesaid Patent No. 1,498,765.

In each case the cans are gradually heated in the preheater to approximately 200°; are then discharged into the preheat-holder, where they are maintained at a uniform heat of approximately 210° F. for from three to twelve minutes, as the particular milk being treated may require. By gradually heating the cans and then holding them for a short time under a uniform temperature of about 210° F. the albumin in the milk is caused to begin to coagulate before the cans enter the sterilizer; and then, as the cans pass through the sterilizer, wherein they are subjected to a temperature of about 240°, the milk is brought to a viscous condition which prevents so-called "separation", that is the lighter components of the milk such as butter fat and cream will not rise to the surface when the cans are cooled and stored.

I have found the best milk is obtained by the use of temperatures hereinbefore stated.

It should be understood that milk is an extremely sensitive product, and it is necessary that some flexibility be permitted in the processing, in order to secure the best results. Of course, these temperatures are subject to slight changes, owing to the conditions of the milk, and also the time the milk is held in the preheat-holder. It would not be possible to obtain the same results by attempting to vary the preheat-holding time of 210° by changing the speed of the machine, as by so doing the coming-up time, or time required to preheat the cans would be seriously affected; further I have found that to prevent "burn-on", or coagulation of milk on the walls of the can, that certain initial temperatures and coming-up temperatures must be adhered to quite closely, depending somewhat upon the character of the milk being processed. This may be fairly well fixed, irrespective of the length of time which it is necessary to hold the milk at 210°, in order to secure the proper coagulation of the albumin within the milk, and start the formation of body or viscosity. It might be possible in the preheat-holder to obtain a certain amount of variation in the holding time through the expedient of changing the speed, but this has two serious objections: One is that the holding time will vary from three minutes to twelve minutes and as the normal speed of the machine is approximately 130 cans per minute, (which would be the speed of the machine at the twelve minute holding time) it would be necessary in order to hold the cans under preheat only three minutes to run the machine four times faster, or at a speed of 520 cans a minute. Another serious objection to attempting to get variation in time by varying the speed of travel would be the fact that for the shorter holding time the agitation of the milk would be four times as great; that is the cans would revolve on their axis and also with the reel four times as fast for three minute holding, as for twelve minute holding; this excess agitation would prevent or lessen coagulation of the albumen with consequential reduction in body building and viscosity.

By the term milk as used in the specification and claims I intended to include whole milk or separated milk in its original form or condensed and with or without flavors.

I claim:

1. The herein described method of processing milk in cans; consisting in gradually preheating the cans until the temperature of their contents is raised to a point below that required for sterilization; then holding the cans for a period of time at a definite substantially uniform temperature below that required for sterilization; then subjecting the cans to a temperature sufficient to sterilize their contents and to an exterior pressure above atmospheric; then cooling the cans; and finally discharging the cans.

2. The method of processing milk in cans; consisting in gradually preheating the cans by passing them through a plurality of chambers of successively higher temperatures, the last chamber having a temperature below that required for sterilization; then holding the cans for a length of time at a substantially uniform temperature above that in the preheater but below that required for sterilization; then subjecting the cans to a temperature sufficient to sterilize their contents and to an exterior pressure above atmospheric; then subjecting the cans to a cooling medium under an external pressure sufficient to prevent internal pressure injuring the cans, and finally discharging the cans.

3. The herein described method of processing milk in cans; consisting in passing the cans successively through a preheating chamber in which the temperature of their contents is raised to a point below that required for sterilization; then passing said cans through a preheat-holding chamber in which the cans are held at a temperature below that required for sterilization; then passing said cans into and through a sterilizing chamber in which the cans are subjected to a temperature sufficient to sterilize their contents and to an exterior pressure above atmospheric; then passing said cans from said sterilizing chamber into and through a cooling chamber wherein the cans are cooled under an external pressure sufficient to prevent the internal pressure injuring the cans; and finally discharging the cans from the cooling chamber.

4. The method of processing milk in cans; consisting in passing the cans successively in a continuous stream through a plurality of preheating chambers of successively higher temperature, reaching a maximum in the last chamber below the temperature required for sterilization; then passing said cans through a preheat-holding chamber in which the cans are held at a uniform temperature above that in the preheating chambers but below that required for sterilization; then passing said cans from said preheat holding chamber into and through a sterilizing chamber in which the cans are subjected to a temperature sufficient to sterilize their contents and to an exterior pressure above atmospheric; then passing said cans from said sterilizing chamber into and through a cooling chamber wherein the cans are subjected to a cooling medium under an external pressure sufficient to prevent internal pressure injuring the cans, and finally discharging the cans from the cooling chamber.

5. The herein described method of processing milk in hermetically sealed cans; consisting in passing the cans successively in a continuous stream through a plurality of preheating chambers of successively higher temperature in which their temperature is raised to a point below that required for sterilization; then passing said cans without interruption from the last preheating chamber through a preheat holding chamber in which the cans are held at a uniform temperature above that in the last preheating chamber but below that required for sterilization; then passing said cans without interruption from said preheat-holding chamber into and through a sterilizing chamber in which said containers are subjected to a temperature sufficient to sterilize the contents of the cans and to an exterior pressure above atmospheric; then passing said cans without exposure to atmospheric pressure continuously from said sterilizing chamber into and through a cooling chamber wherein the cans are subjected to a cooling medium under an external pressure sufficient to prevent internal pressure injuring the cans; and finally discharging the cans from the cooling chamber.

6. The herein described method of processing milk in cans; consisting in gradually preheating the cans until the temperature of their contents is raised to a point below that required for sterilization; then holding the cans for a length of time at a substantially uniform temperature below that required for sterilization; then subjecting the cans to a temperature sufficient to sterilize their contents; and then cooling the cans.

7. The herein described method of processing canned milk in closed containers consisting in gradually preheating the containers until the temperature of the food therein is raised to a point below that required for sterilization; then holding the containers for a definite length of time at a substantially uniform temperature slightly below that required for sterilization; then subjecting the containers to a temperature sufficient to sterilize the food and finally cooling the containers.

8. The method of processing milk in cans; consisting in gradually preheating the cans by passing them through a plurality of chambers of successively higher temperatures, until their temperature is raised to a point below that required for sterilization; then holding the cans for a definite predetermined length of time at a substantially uniform temperature below that required for sterilization; then subjecting the cans to a temperature sufficient to sterilize their contents and then cooling cans.

In testimony that I claim the foregoing as my own, I affix my signature.

ALBERT R. THOMPSON.